(12) United States Patent
Aoyama

(10) Patent No.: US 11,940,397 B2
(45) Date of Patent: Mar. 26, 2024

(54) RADIATION DETECTION DEVICE, RECORDING MEDIUM, AND POSITIONING METHOD

(71) Applicant: HORIBA, LTD., Kyoto (JP)

(72) Inventor: Tomoki Aoyama, Kyoto (JP)

(73) Assignee: HORIBA, LTD., Kyoto (JP)

(*) Notice: Subject to any disclaimer, the term of this patent is extended or adjusted under 35 U.S.C. 154(b) by 501 days.

(21) Appl. No.: 17/251,298

(22) PCT Filed: Jun. 6, 2019

(86) PCT No.: PCT/JP2019/022580
§ 371 (c)(1),
(2) Date: Dec. 11, 2020

(87) PCT Pub. No.: WO2019/240011
PCT Pub. Date: Dec. 19, 2019

(65) Prior Publication Data
US 2021/0262953 A1 Aug. 26, 2021

(30) Foreign Application Priority Data
Jun. 15, 2018 (JP) ................................ 2018-114908

(51) Int. Cl.
*G01N 23/223* (2006.01)
*G01B 9/04* (2006.01)

(52) U.S. Cl.
CPC ............. *G01N 23/223* (2013.01); *G01B 9/04* (2013.01); *G01N 2223/076* (2013.01);
(Continued)

(58) Field of Classification Search
CPC ....................................................... G01B 9/04
See application file for complete search history.

(56) References Cited

U.S. PATENT DOCUMENTS 7,258,485 B2 * 8/2007 Nakano ............ G01N 23/20016
378/197
7,356,114 B2 * 4/2008 Kataoka ................. G01B 15/02
378/50
(Continued)

FOREIGN PATENT DOCUMENTS

CN 107356619 A 11/2017
JP H09-61383 A 3/1997
(Continued)

OTHER PUBLICATIONS

PCT, International Search Report for the corresponding patent application No. PCT/JP2019/022580, dated Sep. 3, 2019, with English translation.
(Continued)

*Primary Examiner* — Thomas R Artman
(74) *Attorney, Agent, or Firm* — LUCAS & MERCANTI, LLP

(57) ABSTRACT

The radiation detection device includes: a sample holding unit; an optical microscope configured to observe a sample held by the sample holding unit; an irradiation unit that irradiates the sample with radiation; a detection unit that detects radiation generated from the sample; an adjustment unit that adjusts a relationship between a focal position of the optical microscope and a position of the sample such that the optical microscope is focused on one portion of the sample; a change unit that changes a position, on which the optical microscope is to be focused, on the sample; an imaging unit that creates a partial image captured by the optical microscope at the changed position on the sample in a state in which the adjustment unit performs adjustment for focusing; and a sample image creation unit that creates a sample image by combining a plurality of partial images created by the imaging unit.

10 Claims, 10 Drawing Sheets

(52) U.S. Cl.
CPC . *G01N 2223/1016* (2013.01); *G01N 2223/32* (2013.01); *G01N 2223/402* (2013.01); *G01N 2223/6116* (2013.01)

(56) References Cited

U.S. PATENT DOCUMENTS

| | | | | |
|---|---|---|---|---|
| 7,970,101 | B2 * | 6/2011 | Sakai | G01N 23/223 378/45 |
| 8,000,439 | B2 * | 8/2011 | Matoba | G01N 23/223 378/45 |
| 8,408,789 | B2 * | 4/2013 | Takahara | G01N 23/223 378/63 |
| 9,810,648 | B2 * | 11/2017 | Takahara | H01J 35/16 |
| 10,697,907 | B2 * | 6/2020 | Reinis | G01N 23/223 |
| 11,125,703 | B2 * | 9/2021 | Taroura | G01N 23/223 |
| 2006/0088139 | A1 * | 4/2006 | Nakano | G01N 23/20025 378/79 |
| 2007/0058776 | A1 * | 3/2007 | Kataoka | G01N 23/223 378/50 |
| 2010/0046700 | A1 | 2/2010 | Sakai et al. | |
| 2010/0046701 | A1 * | 2/2010 | Matoba | G01N 23/223 378/44 |
| 2011/0051894 | A1 | 3/2011 | Takahara | |
| 2013/0284924 | A1 * | 10/2013 | Mizuochi | H01J 37/21 250/310 |
| 2016/0146745 | A1 | 5/2016 | Takahara | |
| 2017/0328842 | A1 * | 11/2017 | Otani | G01N 21/95607 |
| 2018/0128756 | A1 | 5/2018 | Reinis et al. | |
| 2019/0331618 | A1 * | 10/2019 | Taroura | G01N 23/223 |
| 2021/0262953 | A1 * | 8/2021 | Aoyama | G01B 11/0608 |

FOREIGN PATENT DOCUMENTS

| | | | |
|---|---|---|---|
| JP | 2003-331769 A | | 11/2003 |
| JP | 2004-012238 A | | 1/2004 |
| JP | 2004-069407 A | | 3/2004 |
| JP | 2004069407 A | * | 3/2004 |
| JP | 2004-191183 A | | 7/2004 |
| JP | 2007-178370 A | | 7/2007 |
| JP | 2009300232 A | | 12/2009 |
| JP | 2010-071969 A | | 4/2010 |
| JP | 2011-047898 A | | 3/2011 |
| JP | 2011-149893 A | | 8/2011 |
| JP | 2014-038034 A | | 2/2014 |
| JP | 2014038034 A | * | 2/2014 |
| JP | 2016-099308 A | | 5/2016 |
| WO | WO-2018110254 A1 | * | 6/2018 ......... G01N 23/2204 |

OTHER PUBLICATIONS

Japanese Office Action dated Feb. 14, 2023 for the corresponding Japanese Patent Application No. 2020-525505, and English translation thereof, 10 pages.

* cited by examiner

FIG. 5

| DISTANCE (D1) | IRRADIATION DIAMETER (D5) |
|---|---|
| * * | * * |
| * * | * * |

542

RADIATION DETECTION DEVICE, RECORDING MEDIUM, AND POSITIONING METHOD

CROSS REFERENCE TO RELATED APPLICATION

This Application is a 371 of PCT/JP2019/022580 filed on Jun. 6, 2019 which, in turn, claimed the priority of Japanese Patent Application No. 2018-114908 filed on Jun. 15, 2018, both applications are incorporated herein by reference.

FIELD

The present invention relates to a radiation detection device, a computer program, and a positioning method that perform observation of a sample, irradiation of the sample with radiation, and detection of radiation generated from the sample.

BACKGROUND

X-ray analysis is a method that irradiates a sample with radiation, such as electron beams or X-rays, detects characteristic X-rays generated from the sample, and analyzes components included in the sample from a spectrum of the characteristic X-rays. An example of the X-ray analysis is fluorescent X-ray analysis that irradiates a sample with X-rays as radiation. In addition, an X-ray detection device includes an optical microscope for observing a sample. An irradiation portion which is irradiated with radiation in the sample is positioned using the image of the sample captured by the optical microscope. Japanese Patent Laid-Open Publication No. 2011-47898 discloses an X-ray detection device that measures the position of a surface of a sample in a height direction along a direction in which radiation is emitted, using a laser.

SUMMARY

In a case in which the sample used in the X-ray analysis is uneven, the position of the surface of the sample in the height direction changes depending on the position on the sample, and the optical microscope may not be partially focused on the surface of the sample. In a case in which the optical microscope is not focused on the surface of the sample, blurring occurs in the image of the sample. Therefore, in a case in which the sample is uneven, blurring occurs in the image of the sample, and it is difficult to accurately position the irradiation portion on the basis of the image of the sample.

The X-ray detection device disclosed in Japanese Patent Laid-Open Publication No. 2011-47898 can measure the position of the irradiation portion in the height direction, but is not capable of improving the accuracy of positioning the irradiation portion in the lateral direction. Further, the X-ray detection device disclosed in Japanese Patent Laid-Open Publication No. 2011-47898 has the problem that a safety mechanism for a laser is required and the cost is high.

The present disclosure has been made in view of the above-mentioned problems and an object is to provide a radiation detection device, a recording medium, and a positioning method that can improve the accuracy of positioning without using a laser.

A radiation detection device according to an aspect of the present disclosure is characterized by comprising: a sample holding unit; an optical microscope configured to observe a sample held by the sample holding unit; an irradiation unit that irradiates the sample observed by the optical microscope with radiation; a detection unit that detects radiation generated from the sample irradiated with the radiation; an adjustment unit that adjusts a relationship between a focal position of the optical microscope and a position of the sample such that the optical microscope is focused on one portion of the sample; a change unit that changes a position, on which the optical microscope is to be focused, on the sample; an imaging unit that creates a partial image captured by the optical microscope at the position on the sample changed by the change unit in a state in which the adjustment unit performs adjustment for focusing; and a sample image creation unit that creates a sample image by combining a plurality of partial images created by the imaging unit.

The radiation detection device according to an aspect of the present disclosure is characterized by further comprising: a radiation distribution creation unit that sequentially changes a position irradiated with the radiation on the sample and creates a radiation distribution in which a detection result of the radiation is associated with each portion of the sample; and an element distribution creation unit that creates an element distribution indicating a distribution of elements in the sample on the basis of the radiation distribution.

The radiation detection device according to an aspect of the present disclosure is characterized by further comprising: a correction unit that performs deconvolution for the radiation distribution, using a size of each of portions which is irradiated with the radiation in the sample.

In the radiation detection device according to an aspect of the present disclosure, it is characterized in that the element distribution creation unit creates the element distribution including a distribution of the elements in a height direction intersecting a surface of the sample, and the radiation detection device further includes a display unit that displays a cross-sectional view of the sample indicating a distribution of the elements in a plane intersecting the surface of the sample, on the basis of the element distribution.

In the radiation detection device according to an aspect of the present disclosure, it is characterized in that in a case in which the adjustment unit adjusts the focal position and the optical microscope is not focused on the one portion, the adjustment unit moves the sample holding unit such that the optical microscope is focused on the one portion.

The radiation detection device according to an aspect of the present disclosure is characterized by further comprising: a calculation unit that calculates a distance from a predetermined base point to the surface of the sample according to the adjusted focal position, wherein the sample image creation unit creates the sample image including information in which the distance calculated by the calculation unit is associated with each of a plurality of portions of the sample.

The radiation detection device according to an aspect of the present disclosure is characterized by further comprising: a specification unit that specifies the size of the portion irradiated with the radiation in the sample on the basis of the distance calculated by the calculation unit.

A computer program, according to an aspect of the present disclosure, that causes a computer to control a radiation detection device including an optical microscope configured to observe a sample, an irradiation unit that irradiates the sample observed by the optical microscope with radiation, and a detection unit that detects radiation generated from the sample irradiated with the radiation, is characterized by causing the computer to perform a process including: a step of adjusting a relationship between a focal position of the optical microscope and a position of the sample such that the optical microscope is focused on one portion of the sample; a step of changing a position, on which the optical microscope is to be focused, on the sample; a step of creating a partial image captured by the optical microscope at the changed position on the sample in a state in which adjustment of the relationship is performed for focusing; and a step of creating a sample image by combining a plurality of created partial images.

A computer program, according to an aspect of the present disclosure, that causes a computer acquiring data from a radiation detection device including an optical microscope configured to observe a sample, an irradiation unit that irradiates the sample observed by the optical microscope with radiation, and a detection unit that detects radiation generated from the sample irradiated with the radiation, is characterized by causing the computer to perform a process including: a step of creating a sample image by combining a plurality of partial images captured by the optical microscope at a plurality of positions on the sample in a state in which adjustment of the optical microscope is performed for focusing.

The computer program according to an aspect of the present disclosure, is characterized by causing the computer to perform the process further including: a step of specifying a size of a portion which is irradiated with the radiation in the sample; a step of sequentially changing a position irradiated with the radiation on the sample and creating a radiation distribution in which a detection result of the radiation and the specified size are associated with each portion of the sample; and a step of performing deconvolution for the radiation distribution, using the size associated with each portion of the sample.

A method for positioning a portion to be irradiated with radiation in a sample, according to an aspect of the present disclosure, using a radiation detection device including an optical microscope configured to observe a sample, an irradiation unit that irradiates the sample observed by the optical microscope with the radiation, and a detection unit that detects radiation generated from the sample irradiated with the radiation, is characterized by comprising: adjusting a relationship between a focal position of the optical microscope and a position of the sample such that the optical microscope is focused on one portion of the sample; sequentially changing a position, on which the optical microscope is to be focused, on the sample; creating a partial image captured by the optical microscope at the changed position on the sample in a state in which adjustment of the relationship is performed for focusing; creating a sample image by combining a plurality of created partial images; and positioning the portion to be irradiated with the radiation in the sample, on the basis of the sample image.

In an aspect of the present disclosure, the radiation detection device focuses the optical microscope on each of a plurality of portions of the sample, captures a plurality of partial images of the portions, combines the plurality of partial images to create the sample image in which the optical microscope is focused on the plurality of portions of the sample, and displays the sample image. Even in a case in which the sample is uneven, blurring is less likely to occur and the plurality of portions of the sample are clearly displayed. The user can position the portion, which is to be irradiated with radiation and is to be analyzed, in the sample while checking the displayed sample image.

Further, in an aspect of the present disclosure, the radiation detection device irradiates each portion of the sample with radiation and detects radiation generated from each portion. The radiation detection device creates the radiation distribution in which the detection result of the radiation and the irradiation size of the radiation are associated with each portion of the sample. In addition, the radiation detection device creates the element distribution on the basis of the radiation distribution. The size of the portion irradiated with radiation in the sample is related to the spatial resolution of the radiation distribution and the element distribution. Since the size of each portion irradiated with radiation in the sample is recorded, it is possible to understand the spatial resolution of the radiation distribution and the element distribution.

Furthermore, in an aspect of the present disclosure, the radiation detection device performs deconvolution for the radiation distribution using the size of each portion irradiated with radiation in the sample and creates the element distribution on the basis of the radiation distribution subjected to the deconvolution. Since the size of the portion irradiated with radiation which varies depending on the position on the sample is used, the deconvolution is appropriately performed. Therefore, the element distribution, in which the position and amount of elements included in the sample are reflected as accurately as possible, is obtained.

Moreover, in an aspect of the present disclosure, the radiation detection device creates the element distribution of the sample in the height direction and displays a cross-sectional view indicating the distribution of the elements in a plane parallel to the height direction. The cross-sectional view makes it possible to understand the distribution of the elements in the sample in the height direction.

In addition, in an aspect of the present disclosure, at the time of creation of the partial image, in a case in which the optical microscope is not focused on the surface of the sample even though the focal position of the optical microscope is adjusted, the radiation detection device moves the sample in the height direction. It is possible to perform adjustment for focusing the optical microscope on the surface of the sample without expanding the range in which the focal position of the optical microscope can be adjusted.

Further, in an aspect of the present disclosure, the radiation detection device adjusts the focal position of the optical microscope to calculate the distance from a predetermined base point to the surface of a plurality of portions of the sample. The distance varies depending on the position on the sample. The user can perform positioning with reference to the distance. Therefore, it is possible to adjust the position of the portion, which is to be irradiated with radiation and is to be analyzed, in the sample in the height direction.

Further, in an aspect of the present disclosure, the radiation detection device specifies the size of the portion irradiated with radiation in the sample according to the distance from a predetermined base point to the surface of the sample. The size varies depending on the position on the sample. The user knows the range of the sample irradiated with radiation and the range of the sample in which radiation is generated. The user can perform positioning with reference to the size. Therefore, it is possible to adjust the size of the portion, which is to be irradiated with radiation and is to be analyzed, in the sample.

In an aspect of the present disclosure, the details of the sample are clearly displayed, and the user can accurately position the portion, which is to be irradiated with radiation and is to be analyzed, in the sample. Therefore, an aspect of the present disclosure has excellent effects. For example, it is possible to improve the accuracy of positioning in the radiation detection device without using a laser.

The above and further objects and features will more fully be apparent from the following detailed description with accompanying drawings.

BRIEF DESCRIPTION OF THE DRAWINGS

FIG. 5 is a conceptual diagram illustrating an example of the content of a position table;

DETAILED DESCRIPTION

Hereinafter, the present disclosure will be described in detail on the basis of the drawings illustrating embodiments.

(Embodiment 1)

Figure 1:
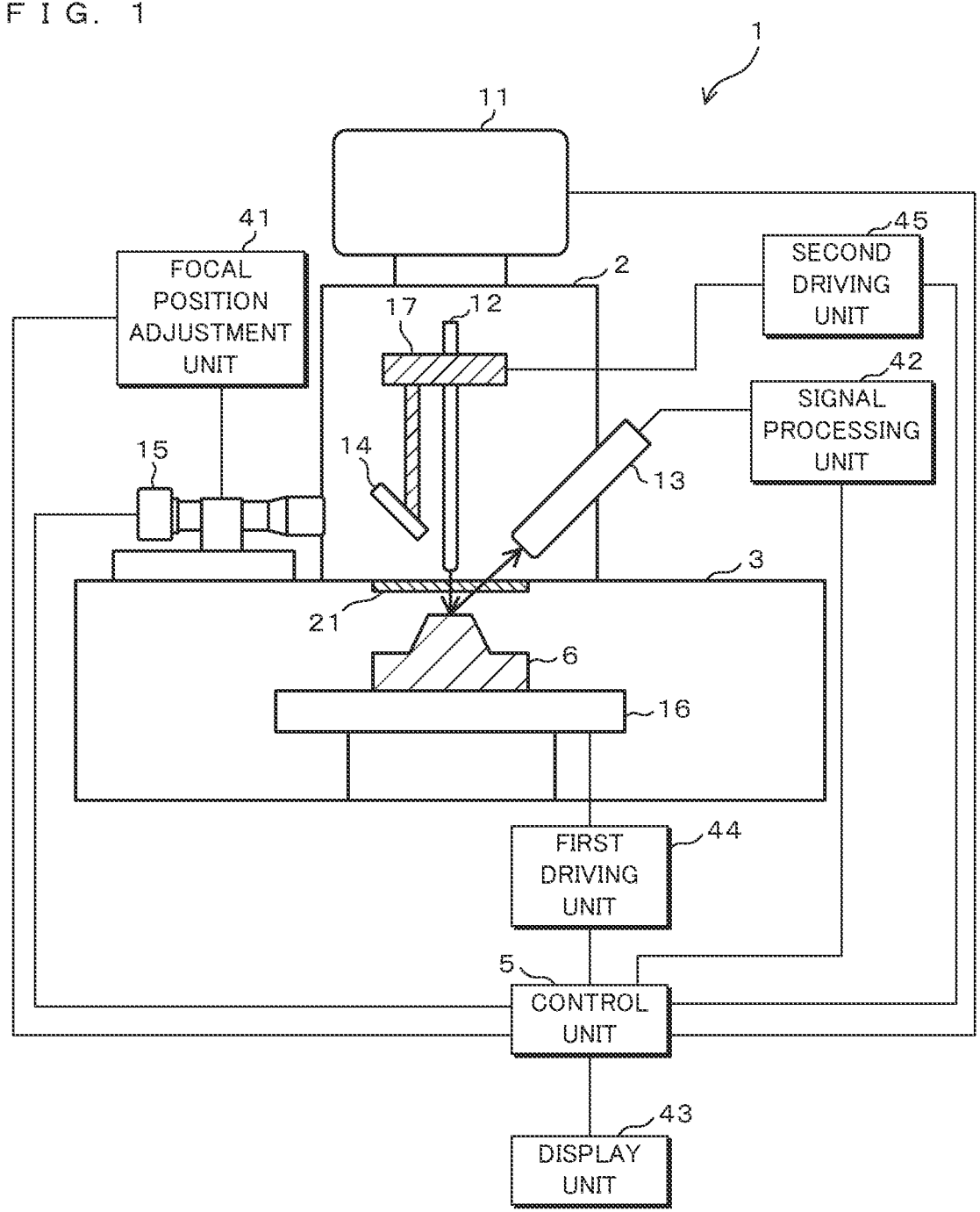
FIG. 1 is a block diagram illustrating the configuration of an X-ray detection device.

FIG. 1 is a block diagram illustrating the configuration of an X-ray detection device 1. The X-ray detection device is a fluorescent X-ray analysis device and corresponds to a radiation detection device. The X-ray detection device includes a sample table 16 on which a sample 6 is placed, an X-ray source 11 that emits X-rays, an X-ray optical element 12 that converges the X-rays emitted from the X-ray source 11 and irradiates the sample 6 with the X-rays, and a detection unit 13 that detects the X-rays. The sample table 16 corresponds to a sample holding unit. The sample holding unit may hold the sample using methods other than the placement. The X-ray source 11 is, for example, an X-ray tube. The X-ray optical element 12 is, for example, a mono-capillary lens using an X-ray guide tube that guides incident X-rays while internally reflecting the X-rays or a poly-capillary lens using a plurality of X-ray guide tubes. The X-rays emitted by the X-ray source 11 are incident to the X-ray optical element 12 and the X-ray optical element 12 converges the X-rays. The X-rays converged by the X-ray optical element 12 are emitted to the sample 6 placed on the sample table 16. The X-ray source 11 and the X-ray optical element 12 correspond to an irradiation unit. Fluorescent X-rays are generated in a portion irradiated with the X-rays in the sample 6. The detection unit 13 detects the fluorescent X-rays generated from the sample 6 and outputs signals that is proportional to the energy of the detected fluorescent X-rays. In FIG. 1, the X-rays emitted to the sample 6 and the fluorescent X-rays are indicated by arrows.

Further, the X-ray detection device includes a light source (not illustrated) that illuminates the sample 6, a mirror 14, an optical microscope 15, and a switching stage 17 that switches the positions of the X-ray optical element 12 and the mirror 14. The X-ray optical element 12 and the mirror 14 are attached to the switching stage 17. The switching stage 17 is moved to change the positions of the X-ray optical element 12 and the mirror 14. As illustrated in FIG. 1, the switching stage 17 can locate the X-ray optical element 12 at an irradiation position. The irradiation position is a position where the X-rays from the X-ray source 11 are incident to the X-ray optical element 12 and the sample 6 placed on the sample table 16 is irradiated with the X-rays emitted from the X-ray optical element 12.

Figure 2:
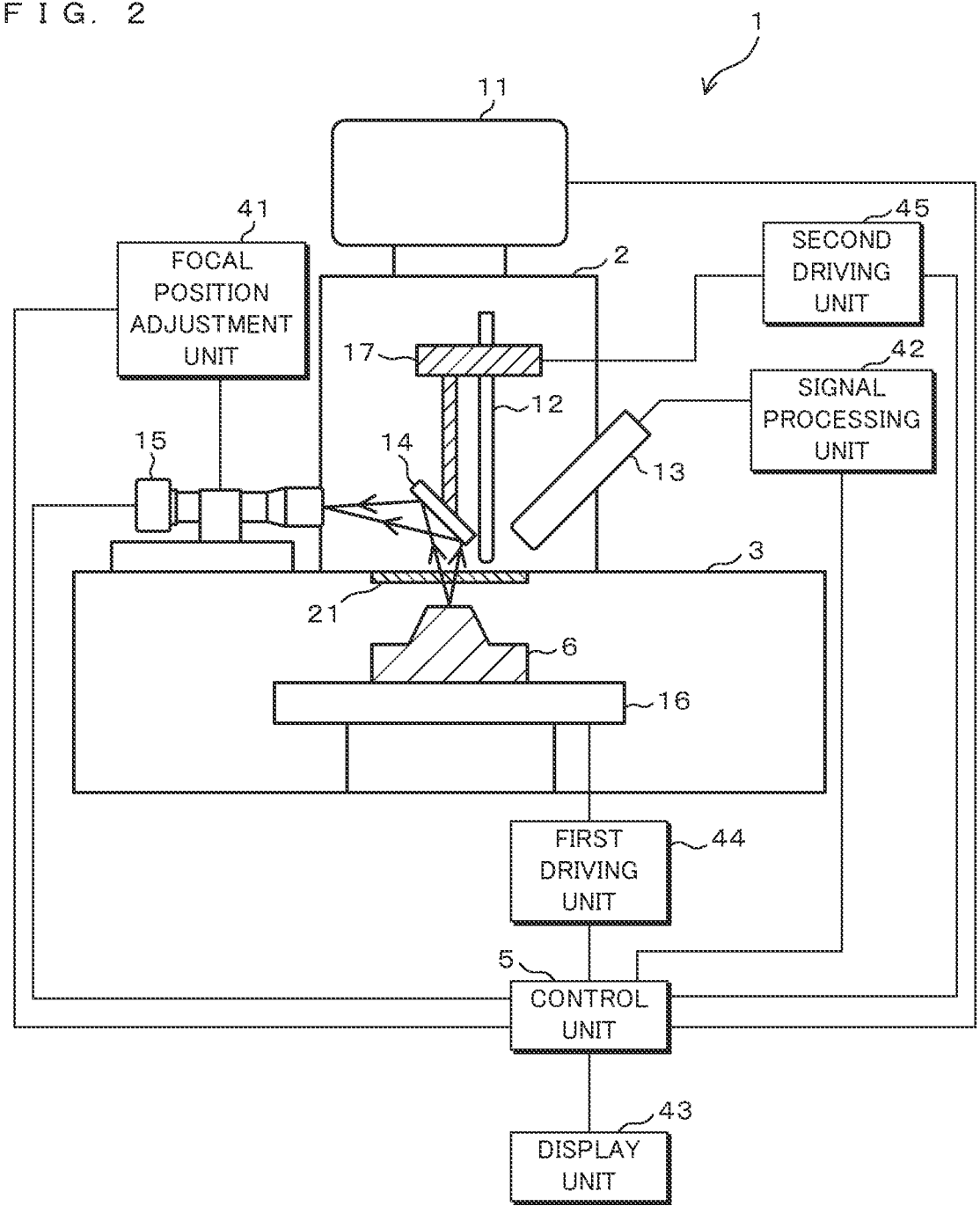
FIG. 2 is a block diagram illustrating the X-ray detection device in which the positions of an X-ray optical element and a mirror have been changed.

FIG. 2 is a block diagram illustrating the configuration of the X-ray detection device 1 in which the positions of the X-ray optical element 12 and the mirror 14 have been changed. The switching stage 17 can change the positions of the X-ray optical element 12 and the mirror 14 to locate the mirror 14 at an imaging position. The imaging position is a position where the optical axis of the mirror 14 at the imaging position and the optical axis of the X-ray optical element 12 at the irradiation position are substantially aligned with each other. The mirror 14 at the imaging position is located on the irradiation axis of the X-rays. The light that illuminates the sample 6 is reflected by the sample 6. As illustrated in FIG. 2, the mirror 14 at the imaging position reflects the light reflected by the sample 6 so as to be incident to the optical microscope 15. In FIG. 2, the light is indicated by an arrow.

The optical microscope 15 has an imaging element. In a state in which the mirror 14 is located at the imaging position, the optical microscope 15 detects the incident light and captures an image of the sample 6. The focus of the optical microscope 15 is fixed. That is, the distance from the optical microscope 15 to the focus along the optical axis is constant. The optical microscope 15 is moved to change a focal position in the X-ray detection device. In addition, the optical microscope 15 may include an optical system, and the optical system may be adjusted to change the focal position. Further, the X-ray detection device may further include an optical system such as a lens.

The X-ray detection device 1 includes a vacuum chamber 2 and a sample chamber 3. The vacuum chamber 2 and the sample chamber 3 are connected to each other. The vacuum chamber 2 is disposed above the sample chamber 3. At least a portion of each of the X-ray optical element 12, the detection unit 13, and the mirror 14 is disposed in the vacuum chamber 2. The X-ray source 11 and the optical microscope 15 may be partially or wholly disposed inside the vacuum chamber 2 or may be disposed outside the vacuum chamber 2. The sample table 16 is disposed in the sample chamber 3. The sample 6 placed on the sample table 16 is disposed in the sample chamber 3.

A window portion 21 is provided at the boundary between the vacuum chamber 2 and the sample chamber 3. The window portion 21 has a flat plate shape and includes a portion of the bottom of the vacuum chamber 2 and a portion of the upper surface of the sample chamber 3. The X-ray optical element 12 has an X-ray emission opening disposed so as to face the window portion 21. The sample table 16 has a placement surface on which the sample 6 is placed and which faces the window portion 21. The sample 6 placed on the sample table 16 has a surface disposed so as to face the window portion 21. The window portion 21 can transmit the X-rays and light. For example, the window portion 21 is transparent, and a through hole through which the X-rays and the fluorescent X-rays are transmitted is formed in the window portion 21.

The optical microscope 15 is disposed such that light reflected by the sample 6 passes through the window portion 21, is reflected by the mirror 14 at the imaging position, and is incident to the optical microscope 15. The X-ray source 11 and the detection unit 13 are disposed such that the sample 6 is irradiated with the X-rays through the X-ray optical element 12 located at the irradiation position and through the window portion 21 and the fluorescent X-rays generated in the sample 6 are incident to the detection unit 13 through the window portion 21. Since the optical axis of the mirror 14 at the imaging position and the optical axis of the X-ray optical element 12 at the irradiation position are substantially aligned with each other, the optical microscope 15 captures an image of an irradiation portion to be irradiated with the X-rays in the sample.

The X-ray detection device 1 further includes an exhaust unit (not illustrated) that evacuates the vacuum chamber 2. The X-ray detection device 1 may evacuate the vacuum chamber 2 and the sample chamber 3, or may evacuate the vacuum chamber 2 and may not evacuate the sample chamber 3. In the aspect in which the through hole is formed in the window portion 21 and the sample chamber 3 is not evacuated, the vacuum chamber 2 is evacuated with the through hole closed with an X-ray transmission film. In a state in which at least the vacuum chamber 2 is evacuated, irradiation with the X-rays and detection of the fluorescent X-rays are performed.

A signal processing unit 42 that processes the signal output by the detection unit 13 is connected to the detection unit 13. The signal processing unit 42 performs a process of counting the signals of each value output by the detection unit 13 and generating a relationship between the energy of the detected fluorescent X-rays and the number of counts, that is, a fluorescent X-ray spectrum.

A focal position adjustment unit 41 that adjusts the focal position of the optical microscope 15 is connected to the optical microscope 15. The focal position adjustment unit 41 moves the optical microscope 15 to adjust the focal position of the optical microscope 15 in the X-ray detection device. The focal position adjustment unit 41 is configured by, for example, a stepping motor. The focal position adjustment unit 41 adjusts the focal position of the optical microscope 15 such that the optical microscope 15 is focused on the surface of the sample 6 placed on the sample table 16. In addition, the focal position adjustment unit 41 may adjust the optical system included in the optical microscope 15 to adjust the focal position of the optical microscope 15.

The X-ray detection device 1 includes a display unit 43 such as a liquid crystal display. The display unit 43 displays the image of the sample 6 captured by the optical microscope 15. The user visually recognizes the image of the sample 6 displayed on the display unit 43 to observe the sample 6. The sample table 16 is connected to a first driving unit 44 that drives the sample table 16 in a height direction, that is, a direction in which the sample table 16 approaches or is separated from the window portion 21 and in a lateral direction, that is, a direction intersecting the height direction. The height direction is a direction that intersects the surface of the sample 6 placed on the sample table 16. The first driving unit 44 is configured by, for example, a stepping motor. The sample 6 placed on the sample table 16 is moved by the operation of the first driving unit 44. A second driving unit 45 that moves the switching stage 17 is connected to the switching stage 17. The positions of the X-ray optical element 12 and the mirror 14 are changed by the operation of the second driving unit 45. The X-ray detection device 1 may have data output functions including printing on a recording sheet, such as paper, and the recording of electronic data on a recording medium, in addition to the display unit 43.

Figure 3:
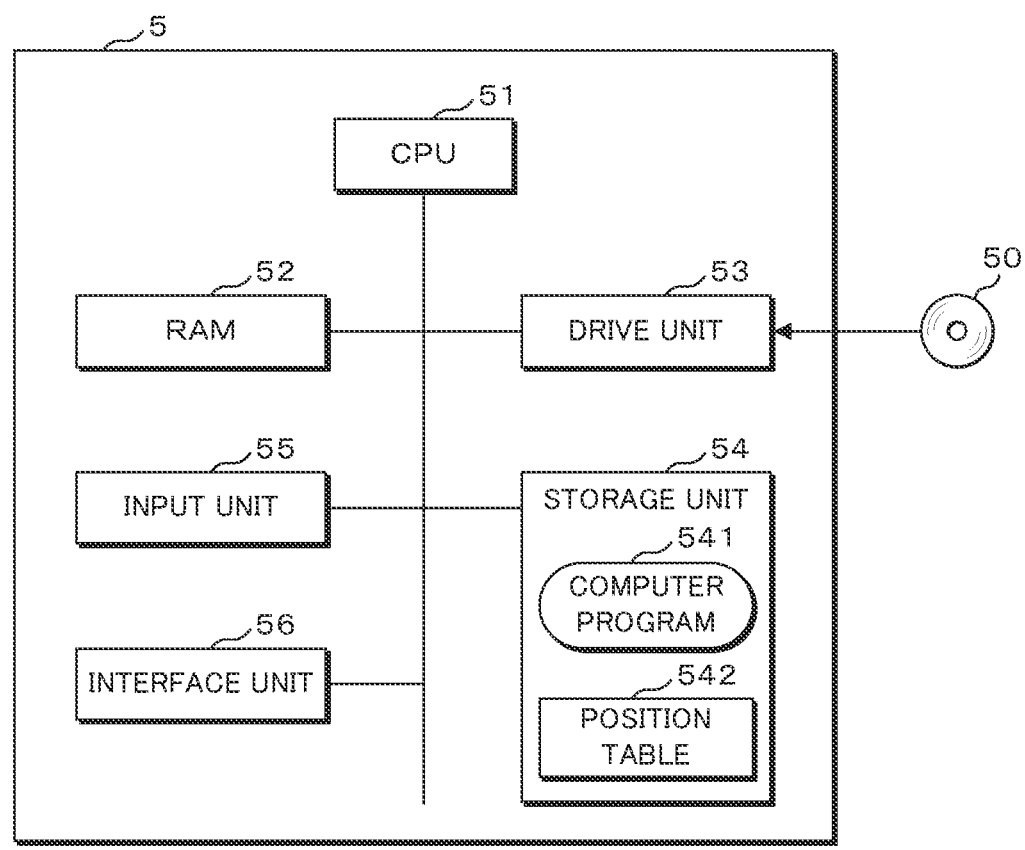
FIG. 3 is a block diagram illustrating an example of the configuration of a control unit.

The X-ray source 11, the optical microscope 15, the focal position adjustment unit 41, the signal processing unit 42, the display unit 43, the first driving unit 44, and the second driving unit 45 are connected to a control unit 5. FIG. 3 is a block diagram illustrating an example of the configuration of the control unit 5. The control unit 5 is configured by a computer such as a personal computer. The control unit 5 includes a central processing unit (CPU) 51 that performs calculation, a random access memory (RAM) 52 that stores temporary information generated by the calculation, a drive unit 53 that reads information from a recording medium 50, such as an optical disk, a non-volatile storage unit 54, and an input unit 55 that is operated by the user to input information such as various processing instructions. The storage unit 54 is, for example, a hard disk drive. The input unit 55 is, for example, a keyboard or a pointing device. Further, the control unit 5 includes an interface unit 56 to which the X-ray source 11, the optical microscope 15, the focal position adjustment unit 41, the signal processing unit 42, the display unit 43, the first driving unit 44 and the second driving unit 45 are connected.

The CPU 51 directs the drive unit 53 to read a computer program 541 from the recording medium 50 and to store the read computer program 541 in the storage unit 54. The CPU 51 loads the computer program 541 from the storage unit 54 into the RAM 52 as needed and executes processes required for the control unit 5 according to the loaded computer program 541. In addition, the control unit 5 may not include the drive unit 53. The computer program 541 may be downloaded from an external server device (not illustrated) to the control unit 5 and then stored in the storage unit 54. Further, the control unit 5 may not receive the computer program 541 from the outside and may have a recording medium on which the computer program 541 has been recorded.

The control unit 5 controls the operations of the X-ray source 11, the optical microscope 15, the focal position adjustment unit 41, the signal processing unit 42, the display unit 43, the first driving unit 44, and the second driving unit 45. The signal processing unit 42 outputs data indicating the generated fluorescent X-ray spectrum to the control unit 5. The control unit 5 receives the data input from the signal processing unit 42 and performs qualitative analysis or quantitative analysis on elements included in the sample 6 on the basis of the fluorescent X-ray spectrum indicated by the input data. Further, the control unit 5 inputs a processing instruction from the user to the input unit 55 and controls each unit of the X-ray detection device 1 according to the input processing instruction. The display unit 43 may display the fluorescent X-ray spectrum generated by the signal processing unit 42 or the analysis results of the control unit 5. Further, the control unit 5 may be configured by a plurality of computers. For example, the control unit 5 may be configured by a computer for controlling the operation of each unit and a computer for performing an analysis process.

Figure 4:
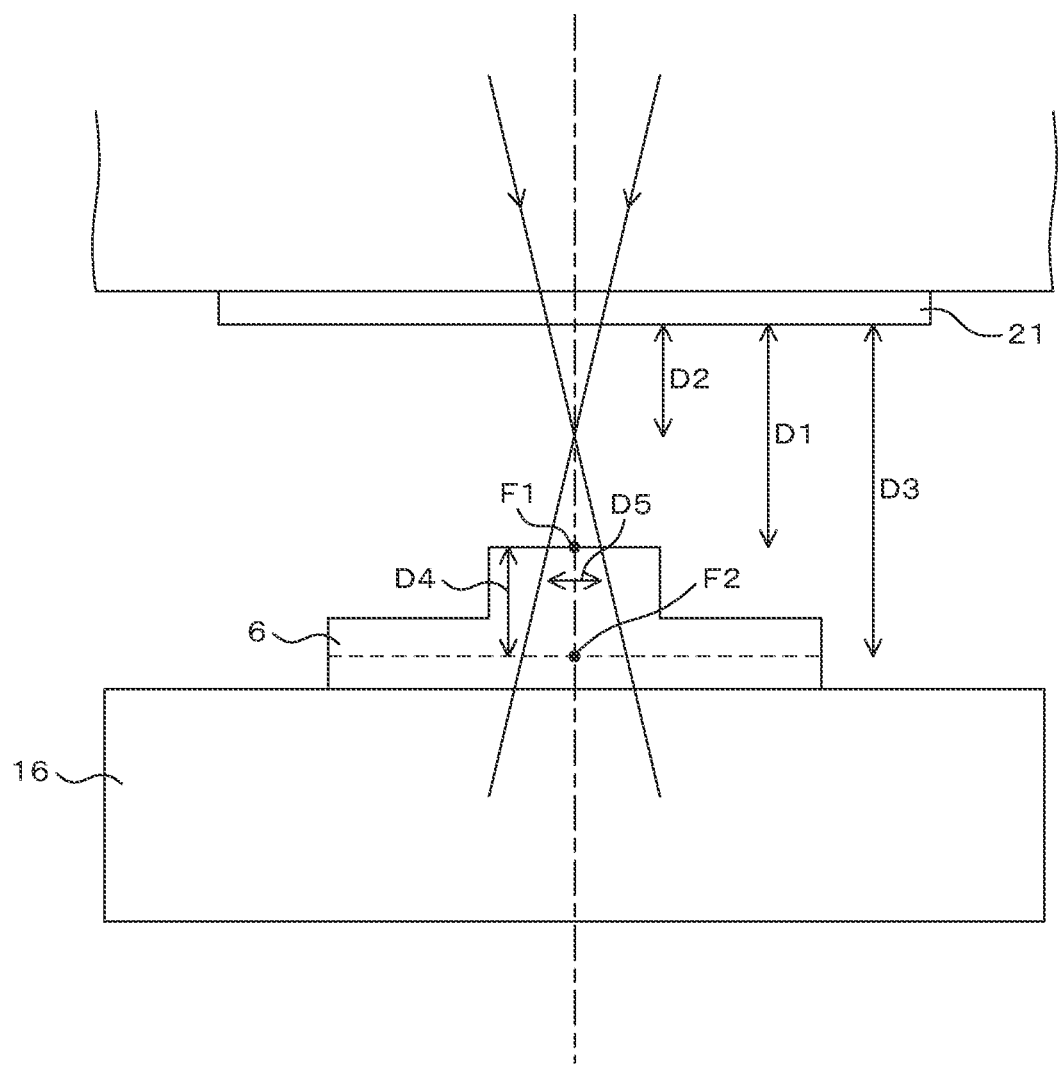
FIG. 4 is a diagram schematically illustrating a relationship between the position of a sample and an irradiation diameter of X-rays on the sample.

FIG. 4 is a diagram schematically illustrating the relationship between the position of the sample 6 and the irradiation diameter of the X-rays on the sample 6. The irradiation diameter is the diameter of the portion irradiated with radiation in the sample 6. In FIG. 4, the sample 6 placed on the sample table 16 and the window portion 21 are illustrated. A surface of the window portion 21 which faces the sample table 16 is referred to as a lower surface of the window portion 21. In the example illustrated in FIG. 4, the central axis of the X-rays emitted to the sample 6 when the X-ray optical element 12 is at the irradiation position is aligned with the optical axis of light incident to the optical microscope 15 when the mirror 14 is at the imaging position. These axes are indicated by a one-dot chain line. In addition, the X-rays are indicated by solid arrows. The X-rays converged by the X-ray optical element 12 are converged to the minimum and then gradually spread. Therefore, the irradiation diameter of the X-rays on the surface of the sample 6 changes depending on the position of the surface of the sample 6. The irradiation diameter corresponds to the size of the portion irradiated with radiation in the sample 6. It is assumed that the base point of the distance for indicating the position of the sample 6 is the lower surface of the window portion 21.

At the focal position of the X-ray optical element 12, the X-rays are converged to the minimum and the irradiation diameter is the minimum. In a case in which the irradiation diameter is the minimum, the spatial resolution when fluorescent X-ray analysis is performed on the sample 6 is the highest. Therefore, it is desirable to perform the fluorescent X-ray analysis in a state in which the irradiation diameter is the minimum. The position where the X-rays are converged to the minimum is the focal position of the X-ray optical element 12 and is determined by the X-ray optical element 12. That is, an optimum distance D2 which is the distance from the lower surface of the window portion 21 to the position where the irradiation diameter is the minimum is predetermined.

The sample table 16 is driven by the first driving unit 44 controlled by the control unit 5 and is disposed at a predetermined standard position in the height direction. A reference focal position F2 which is the focal position of the optical microscope 15 when the optical microscope 15 is at a predetermined place is a predetermined position. In FIG. 4, the surface of the sample on which the reference focal position F2 is located is represented by a dashed line. A reference distance D3 which is the distance from the lower surface of the window portion 21 to the reference focal position F2 is a predetermined distance. In general, the reference focal position F2 is not on the actual surface of the sample 6, and a distance D1 from the lower surface of the window portion 21 to the irradiation portion irradiated with the X-rays in the sample 6 is different from the reference distance D3. The distance D1 is the distance from the lower surface of the window portion 21 to the surface of the sample 6. The irradiation diameter D5 of the X-rays emitted to the sample 6 is a value depending on the distance D1. In a case in which the sample 6 is uneven, the distance D1 from the lower surface of the window portion 21 to the irradiation portion of the sample 6 and the irradiation diameter D5 of the X-ray vary depending on the position of the irradiation portion of the sample 6.

The focal position F1 of the optical microscope 15 when the optical microscope 15 is focused on the irradiation portion of the actual sample 6 is different from the reference focal position F2. The focal position adjustment unit 41 can automatically adjust the focal position of the optical microscope 15 such that the optical microscope 15 is focused on the irradiation portion of the sample 6. A distance D4 from the adjusted focal position F1 to the reference focal position F2 is obtained on the basis of a distance that the focal position adjustment unit 41 moved the optical microscope 15 when adjusting the focal position. Further, it is possible to calculate the distance D1 from the lower surface of the window portion 21 to the irradiation portion of the sample 6 on the basis of the reference distance D3 and the distance D4 from the focal position F1 to the reference focal position F2.

Figure 5:
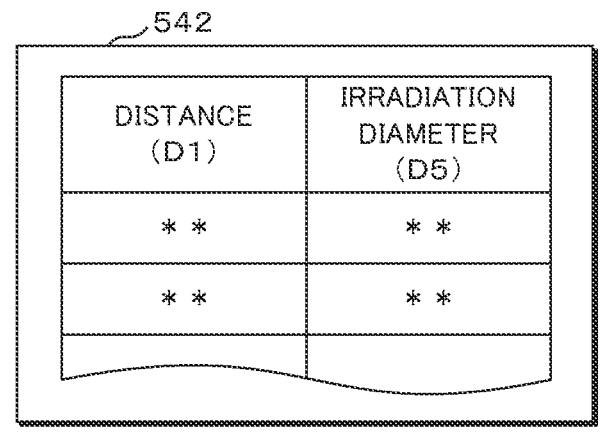

The relationship between the distance D1 from the lower surface of the window portion 21 to the irradiation portion of the sample 6 and the irradiation diameter D5 of the X-rays emitted to the sample 6 is recorded in advance. The storage unit 54 stores a position table 542 in which the values of the distance D1 and the irradiation diameter D5 are recorded so as to be association with each other. FIG. 5 is a conceptual diagram illustrating an example of the content of the position table 542. The value of the irradiation diameter D5 of the X-rays emitted to the sample 6 is recorded so as to be associated with each value of the distance D1 from the lower surface of the window portion 21 to the irradiation portion of the sample 6. The value of the irradiation diameter D5 when the distance D1 is each value is measured in advance. For example, the values of the distance D1 and the irradiation diameter D5 are actually measured using a standard sample while changing the position of the standard sample in the height direction and the values are then recorded.

Figure 6:
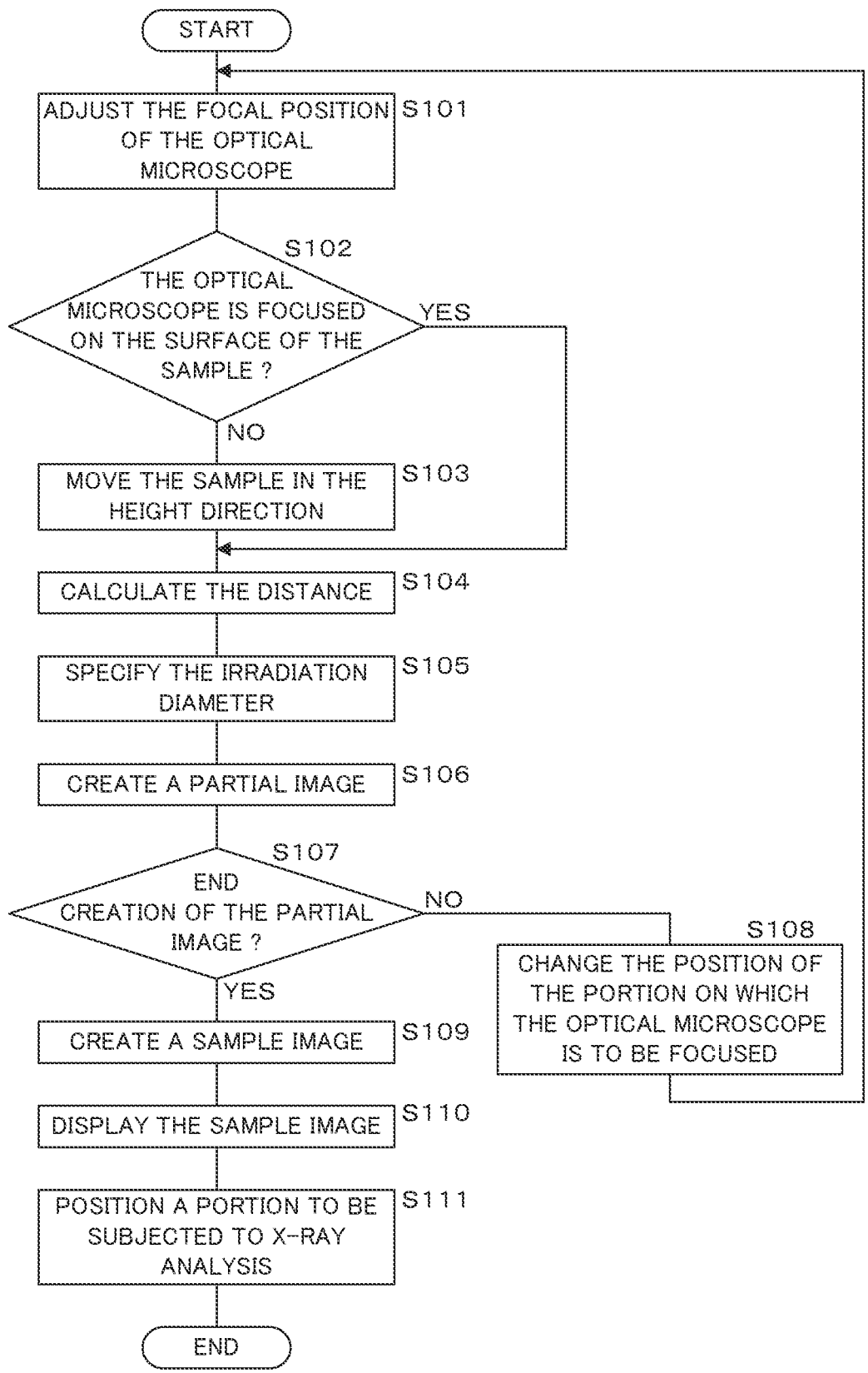
FIG. 6 is a flowchart illustrating the procedure of a process for positioning a portion to be subjected to X-ray analysis in the sample using an X-ray detection device according to Embodiment 1.

FIG. 6 is a flowchart illustrating the procedure of a process for positioning a portion to be subjected X-ray analysis in the sample 6 using the X-ray detection device 1 according to Embodiment 1. The CPU 51 of the control unit 5 performs the following process according to the computer program 541. Hereinafter, a step is abbreviated to S. The control unit 5 operates the second driving unit 45 such that the second driving unit 45 moves the switching stage 17 to dispose the mirror 14 at the imaging position. The position of the sample table 16 on which the sample 6 is placed in the height direction is determined as a predetermined position by the first driving unit 44. The optical microscope 15 captures the image of the sample 6. In general, the optical microscope 15 is not focused on the surface of the sample 6. The focal position adjustment unit 41 adjusts the focal position of the optical microscope 15 such that the optical microscope 15 is focused on the surface of the sample 6 (S101). The portion of the surface of the sample 6 on which the optical microscope 15 is focused is a portion of the surface of the sample 6 which intersects the optical axis of the mirror 14 at the imaging position and corresponds to one portion of the sample. The focal position F1 of the optical microscope 15 when the optical microscope 15 is focused on the surface of the actual sample 6 is determined by the process in S101. The focal position adjustment unit 41 automatically adjusts the focal position using the existing method. The display unit 43 may display the image of the sample 6 captured by the optical microscope 15 and the user who visually recognizes the image may operate the focal position adjustment unit 41 to adjust the focal position.

The CPU 51 determines whether or not the optical microscope 15 is focused on the surface of the sample 6 as a result of adjustment of the focal position by the focal position adjustment unit 41 (S102). For example, the CPU 51 performs the determination according to a signal from the focal position adjustment unit 41. In a case in which the focal position adjustment unit 41 adjusts the focal position and the optical microscope 15 is not focused on the surface of the sample 6 (S102: NO), the CPU 51 moves the sample 6 such that the optical microscope 15 is focused on the surface of the sample 6 (S103). In S103, the CPU 51 operates the first driving unit 44 such that the first driving unit 44 moves the sample table 16 in the height direction to move the sample 6 in the height direction. The focal position adjustment unit 41, the first driving unit 44, and the process in S101 and S103 correspond to an adjustment unit. The adjustment results related to the focal position of the optical microscope 15 and the position of the sample 6 in the height direction (the direction along the optical axis) are determined by the adjustment unit.

After S103 ends or when the optical microscope 15 is focused on the surface of the sample 6 in S102 (S102: YES), the CPU 51 calculates the distance D1 from the lower surface of the window portion 21 to the irradiation portion of the sample 6 (S104). In S104, the CPU 51 specifies the distance D4 from the focal position F1 to the reference focal position F2 and calculates the distance D1 from the lower surface of the window portion 21 to the irradiation portion of the sample 6 on the basis of the distance D4 and the reference distance D3.

For example, the CPU 51 acquires the movement distance of the optical microscope 15 which is moved by the focal position adjustment unit 41 at the time of the adjustment of the focal position from the focal position adjustment unit 41 through the interface unit 56 to specify the distance D4. For example, the movement distance of the optical microscope 15 is represented by the number of steps of the stepping motor, and the CPU 51 converts the number of steps into a length to specify the distance D4. For example, the CPU 51 acquires a distance that the first driving unit 44 moved the sample table 16 in the height direction to specify the distance D4. For example, the distance D4 when the focal position F1 approaches the window portion 21 from the reference focal position F2 is set as a positive value, the distance D4 when the focal position F1 is further separated from the window portion 21 from the reference focal position F2 is set as a negative value, and the CPU 51 subtracts the distance D4 from the reference distance D3 to calculate the distance D1. The value of the reference distance D3 is stored in the storage unit 54 in advance. The CPU 51 may calculate the distance D1 from the distance D4 and the reference distance D3 using other calculation methods. The process in S104 corresponds to a calculation unit.

Then, the CPU 51 specifies the irradiation diameter D5 of the X-rays on the sample 6 from the calculated distance D1 (S105). For example, the CPU 51 reads the irradiation diameter D5 associated with the calculated distance D1 from the position table 542 to specify the irradiation diameter D5. For example, the CPU 51 reads a plurality of irradiation diameters D5 associated with the values before and after the calculated distance D1 from the position table 542 and interpolates the plurality of read irradiation diameters D5 to specify the irradiation diameter D5 of the X-rays on the sample 6. For example, the computer program 541 includes a function of a change in the diameter of the X-rays, and the CPU 51 interpolates a plurality of irradiation diameters D5 read from the position table 542 using the function to specify the irradiation diameter D5 of the X-rays on the sample 6. The process in S105 corresponds to a specification unit.

Then, the CPU 51 creates a partial image by directing the optical microscope 15 to capture the image of the sample 6, with the optical microscope 15 focused on the surface of the sample 6 (S106). The partial image is an image indicating one portion, on which the optical microscope 15 is focused, in the sample 6. The CPU 51 stores data indicating the created partial image in the storage unit 54. In addition, the CPU 51 stores information indicating the distance D1 calculated in S104 and the irradiation diameter specified in S105 in the storage unit 54 so as to be association with the data indicating the partial image. The distance D1 calculated in S104 is the distance from the lower surface of the window portion 21 to the portion, on which the optical microscope 15 is focused, in the sample 6. Further, the irradiation diameter specified in S105 is an irradiation diameter when the portion, on which the optical microscope 15 is focused, in the sample 6 is irradiated with the X-rays. The CPU 51 may also store the position of the sample table 16 in the lateral direction in the storage unit 54 so as to be associated with the data indicating the partial image. The process in S106 corresponds to an imaging unit.

Then, the CPU 51 determines whether or not to end creation of the partial image (S107). For example, in a case in which the partial images of all portions within a specific range or a designated range of the sample 6 have been created, the CPU 51 determines to end creation of the partial image. For example, in a case in which the input unit 55 receives an instruction to end creation of the partial image, the CPU 51 determines to end creation of the partial image. In a case in which creation of the partial image is not ended (S107: NO), the CPU 51 changes the position of the portion, on which the optical microscope 15 is to be focused, in the sample 6 (S108). In 5108, the CPU 51 operates the first driving unit 44 such that the first driving unit 44 moves the sample table 16 in the lateral direction to move the sample 6 in the lateral direction. As a result, the position of a portion, which intersects the optical axis of the mirror 14 at the imaging position, in the sample 6 is changed. That is, the position of the portion, on which the optical microscope 15 is to be focused, in the sample 6 is changed. The process in S108 corresponds to a change unit. After S108, the CPU 51 returns the process to S101. The process in S101 to S108 is repeated to create a plurality of partial images indicating a plurality of portions, on which the optical microscope 15 is focused, in the sample 6. The plurality of partial images include partial images in which the adjustment results by the adjustment unit at the time of imaging are different from each other. The entire region of the sample 6 to be captured is divided into a plurality of partial regions in a matrix. In the process of 5101 to 5108, for example, the X-ray detection device 1 sequentially changes the position of the portion, on which the optical microscope 15 is to be focused, in the sample 6 from one partial region to an adjacent partial region. The field of view of the optical microscope 15 may slightly overlap in peripheral portions of adjacent partial regions.

In a case in which creation of the partial image is ended (S107: YES), the CPU 51 combines a plurality of partial images to create a sample image indicating a plurality of portions of the sample 6 (S109). In the image of the sample 6 captured by only one imaging operation using the optical microscope 15, the optical microscope 15 is focused on a portion of the sample 6 and is not focused on the other portions. Therefore, the image of the sample 6 may include an unclear portion. In the sample image created in S109, a plurality of portions of the sample 6 are in focus and each of the plurality of portions of the sample 6 is clear. The CPU 51 creates a sample image including information in which the distance D1 and the irradiation diameter are associated with each portion of the sample 6. A plurality of partial images in which the adjustment results by the adjustment unit at the time of imaging are different from each other are used in the sample image. Further, the CPU 51 stores data indicating the created sample image in the storage unit 54. The process in S109 corresponds to a sample image creation unit.

Figure 7A:
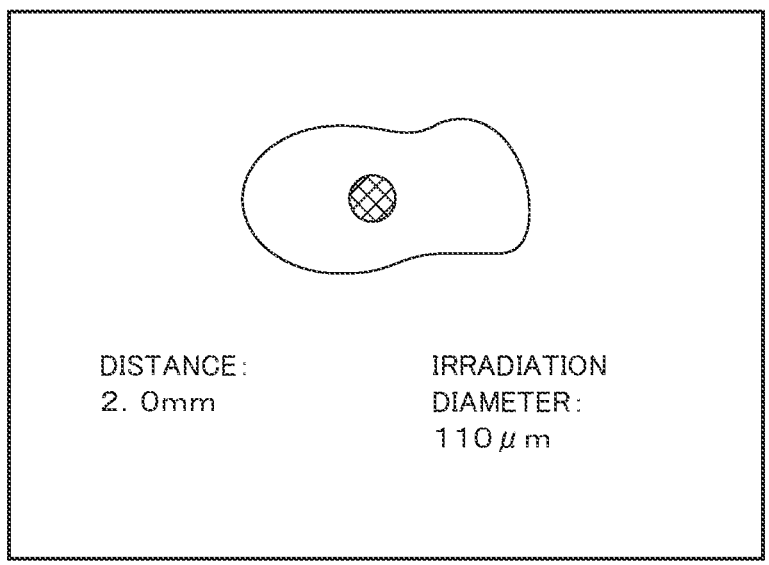
FIG. 7A is a diagram schematically illustrating an example of a sample image displayed on a display unit.
Figure 7B:
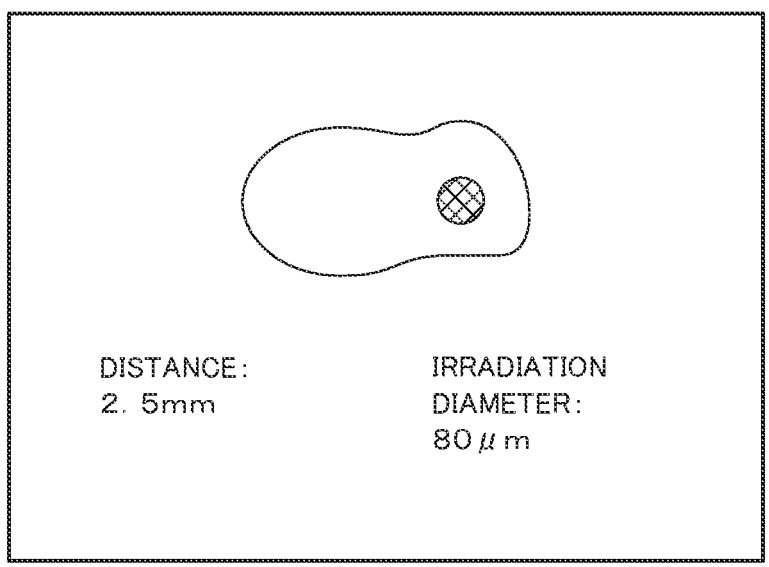
FIG. 7B is a diagram schematically illustrating an example of the sample image displayed on the display unit.

Then, the CPU 51 displays the created sample image on the display unit 43 (S110). FIGS. 7A and 7B are diagrams schematically illustrating an example of the sample image displayed by the display unit 43. In the sample image, a plurality of portions of the sample 6 are in focus and are clearly displayed. In S110, the display unit 43 may display the values of the distance D1 and the irradiation diameter in each portion of the sample 6 in addition to the sample image. For example, as illustrated in FIGS. 7A and 7B, a cursor is displayed so as to be superimposed on the sample image, and the distance D1 and the irradiation diameter associated with the portion which corresponds to the cursor in the sample 6 are displayed. For example, the CPU 51 changes the position of the cursor in response to an instruction received by the input unit 55, reads information indicating the distance D1 and the irradiation diameter associated with the portion which corresponds to the cursor in the sample 6 from the storage unit 54, and displays the distance D1 and the irradiation diameter on the display unit 43. FIGS. 7A and 7B illustrate the values of the distance D1 and the irradiation diameter in different portions of the sample 6. The values of the distance D1 and the irradiation diameter depending on the portion which corresponds to the cursor in the sample 6 are displayed. Different portions of the sample 6 have different values of the distance D1 and the irradiation diameter. In addition, the CPU 51 may create a stereoscopic image of the sample 6 on the basis of the sample image and may display the stereoscopic image on the display unit 43. Further, the CPU 51 may create a cross-sectional view of the sample 6 parallel to the height direction on the basis of the sample image and may display the cross-sectional view on the display unit 43.

Then, the CPU 51 receives an instruction from the user who has checked the displayed sample image through the input unit 55 and positions a portion to be subjected to X-ray analysis in the sample 6 in response to the received instruction (S111). The portion to be subjected to X-ray analysis in the sample 6 is the portion to be irradiated with the X-rays from the X-ray source 11 for X-ray analysis. The position of each portion of the sample 6 in the height direction and the irradiation diameter when each portion of the sample 6 is irradiated with the X-rays are clarified by the sample image. The user understands appropriate information related to each portion of the sample 6 using the sample image. The user inputs an instruction to designate the position of the portion to be subjected to X-ray analysis in the sample 6 to the input unit 55. For example, the user inputs the instruction using the cursor superimposed on the sample image displayed on the display unit 43. In this way, the X-ray detection device 1 ends the positioning process.

After the process in S101 to S111 ends, the user inputs an X-ray analysis start instruction to the input unit 55 as necessary. The control unit 5 controls the operation of the second driving unit 45 such that the switching stage 17 is moved to dispose the X-ray optical element 12 at the irradiation position. Further, the control unit 5 controls the operation of the first driving unit 44 to adjust the position of the sample table 16 such that a portion of the positioned sample 6 is irradiated with the X-rays. At least the vacuum chamber 2 is evacuated and the sample 6 is irradiated with the X-rays. The detection unit 13 detects fluorescent X-rays and the signal processing unit 42 generates a fluorescent X-ray spectrum. The control unit 5 analyzes the elements included in the sample 6.

As described in detail above, in this embodiment, the X-ray detection device 1 creates the sample image in which the optical microscope 15 is focused on a plurality of portions of the sample 6 and displays the sample image. A plurality of portions of the sample 6 are clearly displayed by displaying the sample image. Even in a case in which the sample 6 is uneven, blurring is less likely to occur, and the details of the sample 6 are clearly displayed. The user can accurately check the details of the sample 6 on the basis of the displayed sample image and can accurately position the portion to be subjected to X-ray analysis in the sample 6 in the lateral direction. Therefore, the accuracy of positioning in the X-ray detection device 1 is improved. Further, since the X-ray detection device 1 does not use a laser, a safety mechanism for the laser is not required, and an increase in cost is prevented.

Further, the X-ray detection device 1 adjusts the focal position of the optical microscope 15 to calculate the distance D1 from the lower surface of the window portion 21 to the surface of the sample 6 without using a laser. The distance D1 varies depending on the position on the sample 6. The user can position the portion to be subjected to X-ray analysis in the sample 6 with reference to the distance D1. Therefore, the user can adjust the position of the portion to be irradiated with the X-rays in the sample 6 in the height direction.

In addition, the X-ray detection device 1 specifies the irradiation diameter when each portion of the sample 6 is irradiated with the X-rays according to the distance D1. Since the distance D1 varies depending on the position on the sample 6, the irradiation diameter also varies depending on the position on the sample 6. The user can know the range of the sample 6 which is irradiated with the X-rays and the range of the sample 6 in which fluorescent X-rays are generated. Further, the user can perform positioning with reference to the irradiation diameter. Therefore, the user can adjust the size of the portion to be irradiated with the X-rays in the sample 6.

(Embodiment 2)

Figure 8:
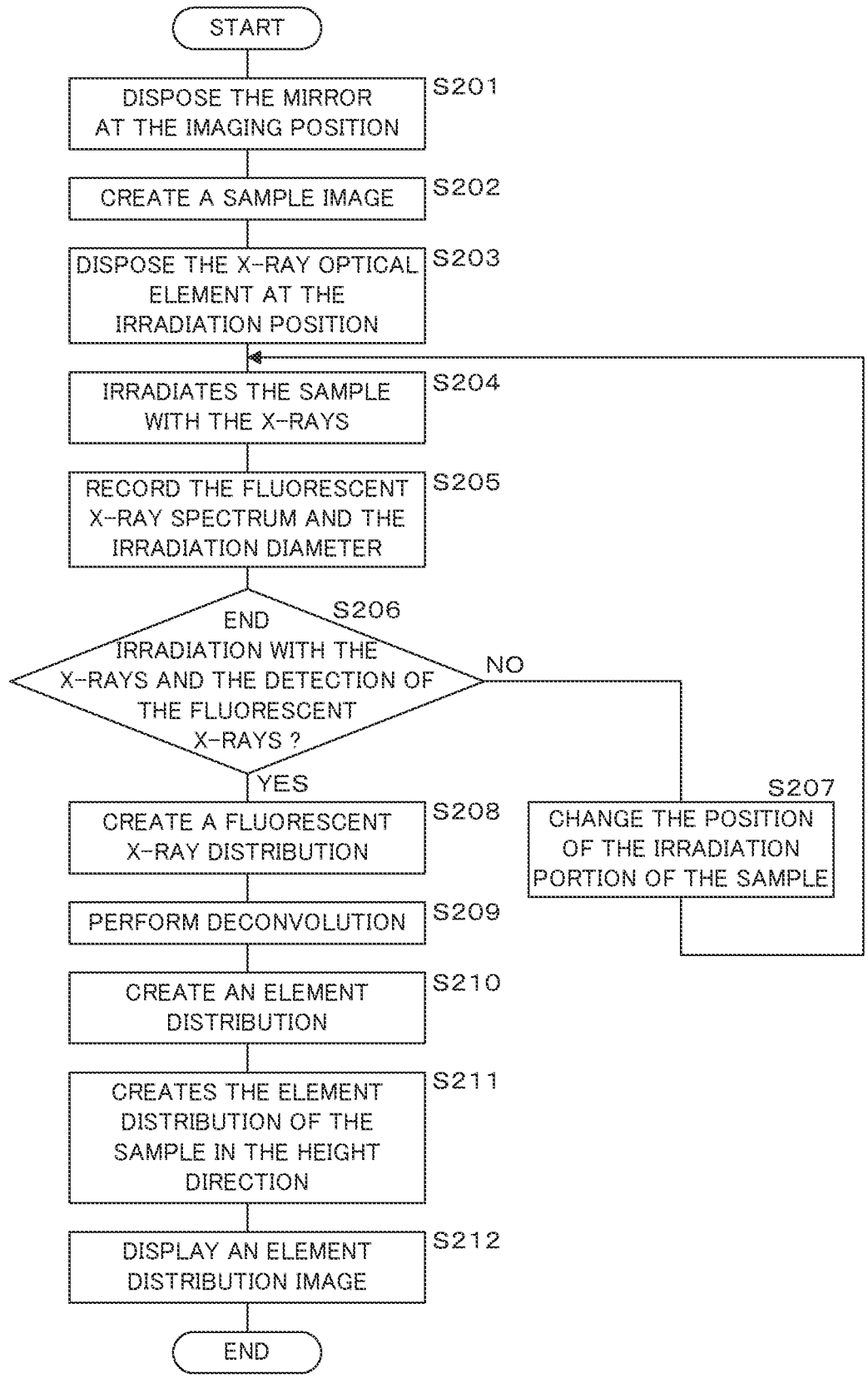
FIG. 8 is a flowchart illustrating the procedure of a process for creating an element distribution using an X-ray detection device according to Embodiment 2.

In Embodiment 2, an aspect in which a distribution of elements included in the sample 6 is created will be described. The configuration of the X-ray detection device 1 is the same as that in Embodiment 1. FIG. 8 is a flowchart illustrating the procedure of a process for creating an element distribution using the X-ray detection device 1 according to Embodiment 2. The CPU 51 of the control unit 5 performs the following process according to the computer program 541. The CPU 51 controls the operation of the second driving unit 45 such that the second driving unit 45 moves the switching stage 17 to dispose the mirror 14 at the imaging position (S201). Then, the CPU 51 performs the same process as that in S101 to S109 described in Embodiment 1 to create a sample image (S202). The CPU 51 stores, in the storage unit 54, data indicating the sample image including information in which the distance D1 and the irradiation diameter are associated with each portion of the sample 6.

The CPU 51 controls the operation of the second driving unit 45 such that the second driving unit 45 moves the switching stage 17 to dispose the X-ray optical element 12 at the irradiation position (S203). Further, the CPU 51 controls the operation of the first driving unit 44 to dispose the sample table 16 at a predetermined position in the height direction and at a position where the sample 6 is irradiated with the X-rays in the lateral direction. The following configuration may be used: the user inputs, to the input unit 55, an instruction to specify the range of the sample 6 in which an element distribution is to be created or the position to be irradiated with the X-rays first in the sample 6, and the CPU 51 adjusts the position of the sample 6 in response to the instruction. Each portion which is irradiated with the X-rays in the sample 6 corresponds to each portion of the sample 6 indicated by the sample image.

The, the X-ray detection device 1 irradiates the sample 6 with the X-rays (S204). In S204, the CPU 51 directs the X-ray source 11 to emit the X-rays. The sample 6 is irradiated with the X-rays through the X-ray optical element 12 and the window portion 21. Fluorescent X-rays are generated in the irradiation portion irradiated with the X-rays in the sample 6. The fluorescent X-rays are transmitted through the window portion 21, and the detection unit 13 detects the fluorescent X-rays. The signal processing unit 42 generates a fluorescent X-ray spectrum and outputs data indicating the fluorescent X-ray spectrum to the control unit 5. The CPU 51 specifies the position of the irradiation portion of the sample 6 based on the position of the sample table 16 in the lateral direction controlled by the first driving unit 44. The CPU 51 specifies a portion corresponding to the irradiation portion from a plurality of portions of the sample 6 in the sample image and specifies an irradiation diameter associated with the specified portion. The CPU 51 acquires the data indicating the fluorescent X-ray spectrum and records the fluorescent X-ray spectrum and the specified irradiation diameter so as to be associated with the position of the irradiation portion (S205). Data in which the fluorescent X-ray spectrum and the irradiation diameter are associated with the position of the irradiation portion is stored in the RAM 52 or the storage unit 54.

Then, the CPU 51 determines whether or not to end irradiation with the X-rays and detection of the fluorescent X-rays (S206). For example, in a case in which irradiation with the X-rays and detection of the fluorescent X-rays have been performed for the specified range of the sample 6, it is determined that irradiation with the X-rays and detection of the fluorescent X-rays are ended. For example, in a case in which irradiation with the X-rays and detection of the fluorescent X-rays have been performed for a specific range of the sample 6, it is determined that irradiation with the X-rays and detection of the fluorescent X-rays are ended. For example, in a case in which an end instruction has been input to the input unit 55, it is determined that irradiation with the X-rays and detection of the fluorescent X-rays are ended.

In a case in which irradiation with the X-rays and detection of the fluorescent X-rays are not ended (S206: NO), the CPU 51 controls the operation of the first driving unit 44 such that the first driving unit 44 moves the sample 6 to change the position of the irradiation portion of the sample 6 (S207). Then, the X-ray detection device 1 returns the process to S204. The X-ray detection device 1 repeats the process in S204 to S207 to sequentially change the position of the irradiation portion of sample 6, and records the fluorescent X-ray spectrum and the irradiation diameter so as to be associated with the position of the irradiation portion whenever the position of the irradiation portion is changed. In this way, the sample 6 is scanned with the X-rays. In the process of S204 to S207, the position of the sample table 16 in the height direction is kept constant.

In a case in which irradiation with the X-rays and detection of the fluorescent X-rays are ended (S206: YES), the CPU 51 creates a fluorescent X-ray distribution in which the fluorescent X-ray spectrum and the irradiation diameter recorded so as to be associated with the position of each irradiation portion are associated with each portion of the sample 6 corresponding to each irradiated portion (S208). The CPU 51 stores data of the fluorescent X-ray distribution in the storage unit 54. The fluorescent X-ray distribution includes the intensity distribution of the fluorescent X-rays of each energy level on the sample 6. The fluorescent X-ray distribution corresponds to a radiation distribution, and the process in S208 corresponds to a radiation distribution creation unit.

Then, the CPU 51 performs deconvolution for the X-ray fluorescence distribution (S209). An example of the deconvolution will be described. The X-rays emitted to the sample 6 have a certain irradiation diameter, and the intensity distribution of the fluorescent X-rays is measured as a distribution different from the original distribution in which the distribution of the elements included in the sample 6 is reflected. The measured intensity distribution of the fluorescent X-rays can be regarded as a convolution of the two-dimensional intensity distribution of the emitted X-rays and the original intensity distribution of the fluorescent X-rays. It is assumed that the measured intensity distribution of the fluorescent X-rays is f(x, y), the original intensity distribution of the fluorescent X-rays is g(x, y), and the two-dimensional intensity distribution of an X-ray is h(x, y) on the xy coordinate system. In this case, f(x, y) is represented by the following Expression (1).

[Equation 1]

$$f(x, y) = \int_{-\infty}^{\infty} \int_{-\infty}^{\infty} h(u, v) g(x - u, y - v) du dv \tag{1}$$

When the Fourier transform of f(x, y) is represented by F[f(x, 37)], F[f(x, y)] is represented by the following Expression (2) according to the convolution theorem:

$$F[f(x, y)] = F[h(x, y)] F[g(x, y)] \quad \ldots (2).$$

Therefore, when the inverse Fourier transform of f(x, y) is represented by $F^{-1}[f(x, y)]$, the original intensity distribution g(x, y) of the fluorescent X-rays can be calculated by the following Expression (3).

[Equation 2]

$$g(x, y) = F^{-1}\left[\frac{F[f(x, y)]}{F[h(x, y)]}\right] \tag{3}$$

Here, f(x, y) corresponds to the intensity distribution of the fluorescent X-rays of each energy level included in the fluorescent X-ray distribution created in S208 on the sample 6. In addition, h(x, y) corresponds to the two-dimensional intensity distribution of the X-rays depending on the irradiation diameter. For example, the CPU 51 approximates f(x, y) with a Gaussian function. In addition, the CPU 51 generates h(x, y) depending on the irradiation diameter according to a predetermined model. For example, h(x, y) may be a Gaussian function that has the irradiation diameter as the half width centered on the coordinates (x, y) of a portion of the sample 6 or a function in which the intensity is 1 inside a circle having the irradiation diameter as the diameter and the intensity is 0 outside the circle. For example, the CPU 51 may calculate the discrete Fourier transform and the inverse discrete Fourier transform using the value of discrete f(x, y) obtained by measurement and of the generated h(x, y). The process in S209 corresponds to a correction unit.

The fluorescent X-ray distribution is corrected by the deconvolution so as to be close to the original distribution, and a high-resolution fluorescent X-ray distribution is obtained. In a case in which the deconvolution is performed using an irradiation diameter larger than the actual irradiation diameter, a fluorescent X-ray distribution different from the actual distribution is obtained. In a case in which the deconvolution is performed using an irradiation diameter smaller than the actual irradiation diameter, the fluorescent X-ray distribution does not change, and the effect of the deconvolution is not obtained. In S209, since the irradiation diameter of the X-rays actually emitted to each portion of the sample 6 is used, the deconvolution is appropriately performed.

Then, the CPU 51 creates an element distribution indicating the distribution of the elements included in the sample 6 using the created fluorescent X-ray distribution (S210). The CPU 51 creates the element distribution using the fluorescent X-ray distribution subjected to the deconvolution. In addition, the CPU 51 may create the element distribution using a fluorescent X-ray distribution that has not been subjected to the deconvolution. The CPU 51 performs element analysis for each portion of the sample 6 on the basis of the fluorescent X-ray distribution and creates an element distribution in which the type and amount of the element specified by the analysis are associated with each portion of the sample 6. The element distribution may include information of the irradiation diameter associated with each portion of the sample 6. The element distribution created in S210 indicates a two-dimensional distribution of the elements included in the sample 6.

Then, the CPU 51 creates the element distribution of the sample 6 in the height direction using the created element distribution (S211). In S211, the CPU 51 specifies a base material of the sample 6 on the basis of the type and amount of a specified element and specifies the transmittance of fluorescent X-rays from each element with respect to the base material. Data required to specify the base material of the sample 6 on the basis of the type and amount of the element and data indicating the transmittance of fluorescent X-rays from each element with respect to the base material are stored in the storage unit 54 in advance. The CPU 51 specifies the depth at which each element is present, according to the transmittance of the fluorescent X-rays from each element. The CPU 51 specifies what type of element is present in each portion of the sample 6 at a certain depth from the surface on the basis of the two-dimensional distribution of the elements. The CPU 51 specifies the position of each element present in each portion of the sample 6 in the height direction on the basis of the distance D1 associated with each portion of the sample 6 in the sample image. The CPU 51 associates the amount of each element with the position in the lateral direction and the height direction to create the element distribution of the sample 6 in the height direction. The process in S210 and S211 corresponds to an element distribution creation unit.

Then, the CPU 51 displays an element distribution image indicating the created element distribution on the display unit 43 (S212). An image indicating a two-dimensional element distribution and/or an image indicating an element distribution in the height direction is displayed on the display unit 43. The CPU 51 creates a cross-sectional view illustrating an element distribution in the plane of the sample 6 parallel to the height direction as the image indicating the element distribution in the height direction, and displays the cross-sectional view on the display unit 43. In addition, the CPU 51 may display, on the display unit 43, an element distribution image indicating an element distribution created using the fluorescent X-ray distribution that has not been subjected to the deconvolution.

Figure 9:
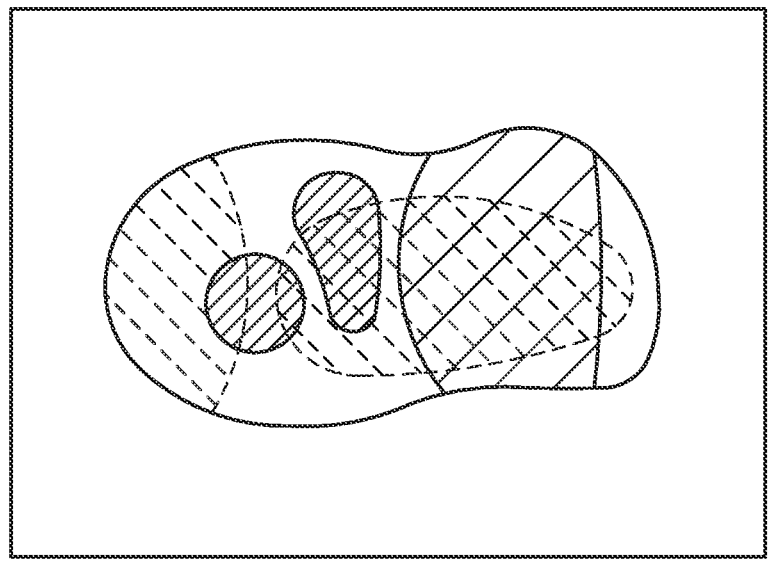
FIG. 9 is a diagram schematically illustrating an example of an image indicating a two-dimensional element distribution of the sample.

FIG. 9 is a diagram schematically illustrating an example of an image indicating a two-dimensional element distribution of the sample 6. FIG. 9 illustrates an example of the distribution of two types of elements. The distribution of one element is represented by solid line hatching, and the distribution of the other element is represented by dashed line hatching. As illustrated in FIG. 9, an image in which the distributions of a plurality of types of elements overlap may be displayed, or images indicating the distributions of each element may be displayed individually. The amount of element is represented by, for example, a color, color density, or brightness. The user can check the displayed element distribution image to understand the two-dimensional distribution of each element on the sample 6.

Figure 10:
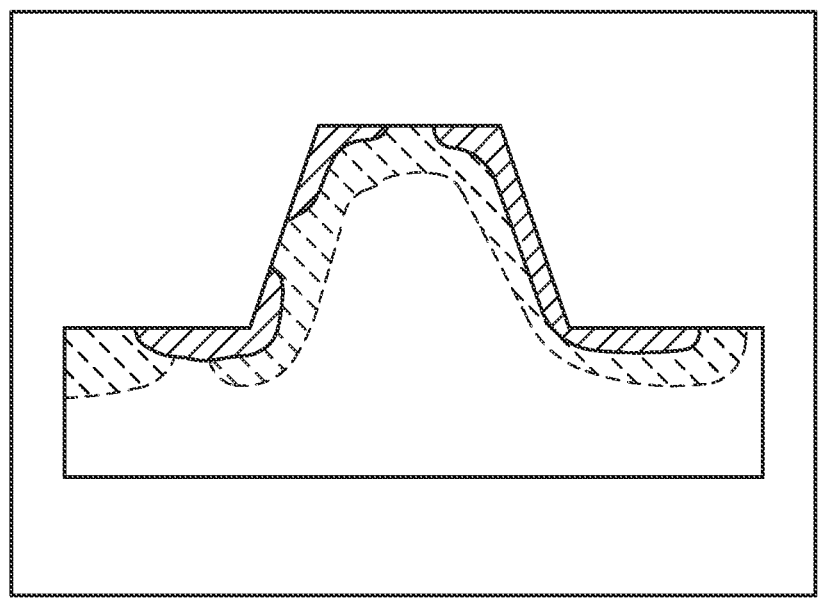
FIG. 10 is a diagram schematically illustrating an example of a cross-sectional view of the sample.

FIG. 10 is a diagram schematically illustrating an example of the cross-sectional view of the sample 6. The cross-sectional view of the sample 6 is illustrated and the distribution of elements in the cross section is illustrated. FIG. 10 illustrates an example of the distribution of light elements and heavy elements. The distribution of the light elements is represented by solid line hatching, and the distribution of the heavy elements is represented by dashed line hatching. Fluorescent X-rays from the heavy elements have high transmittance, and it is possible to detect the heavy elements, which are present at a deeper position than the light elements, using X-ray analysis. The user can check the displayed cross-sectional view to understand the distribution of each element in the sample 6 in the height direction. In this way, the X-ray detection device 1 ends the process of creating the element distribution.

As described in detail above, in this embodiment, the X-ray detection device 1 specifies the irradiation diameter of the X-rays in each portion of the sample 6, scans the sample 6 with the X-rays, creates the fluorescent X-ray distribution in which the irradiation diameter is associated with each portion, and creates the element distribution on the basis of the fluorescent X-ray distribution. The irradiation diameter of the X-rays is related to the spatial resolution of the fluorescent X-ray distribution and the element distribution. That is, as the irradiation diameter becomes smaller, the spatial resolution becomes higher. In a case in which the sample 6 is uneven, the irradiation diameter varies depending on the position of each portion of the sample 6. Therefore, the spatial resolution varies depending on the position in the fluorescent X-ray distribution and the element distribution. The irradiation diameter in each portion of the sample 6 is recorded, which makes it possible for the user to understand the spatial resolution of the fluorescent X-ray distribution and the element distribution.

Further, in this embodiment, the X-ray detection device 1 performs deconvolution for the fluorescent X-ray distribution using the irradiation diameter of the X-rays in each portion of the sample 6, and creates the element distribution on the basis of the fluorescent X-ray distribution subjected to the deconvolution. Since the element distribution is created from the fluorescent X-ray distribution subjected to the deconvolution, the element distribution with high resolution is obtained. Since the deconvolution is performed using the irradiation diameter of the X-rays which varies depending on the position of each portion of the sample 6, the deconvolution is performed appropriately, and the element distribution, in which the position and amount of elements included in the sample 6 are reflected as accurately as possible, is obtained.

In Embodiments 1 and 2, the aspect in which a single X-ray optical element 12 is used has been described. However, the X-ray detection device 1 may include a plurality of X-ray optical elements 12, and the X-ray optical element 12 to be used may be switched by the switching stage 17. Further, in Embodiments 1 and 2, the aspect in which the positions of the X-ray optical element 12 and the mirror 14 are switched by the switching stage 17 has been described. However, the X-ray detection device 1 may include the X-ray optical element 12 and the mirror 14 which are coaxial, and the X-ray optical element 12 and the mirror 14 may be used without switching the positions.

In addition, in Embodiments 1 and 2, the aspect in which the irradiation diameter of the X-rays is used as the size of the irradiation portion of the sample 6 has been described. However, the X-ray detection device 1 may use the irradiation area of the X-rays as the size of the irradiation portion. Further, in Embodiments 1 and 2, the aspect in which the distance D1 from the lower surface of the window portion 21 to the irradiation portion of the sample 6 is calculated using the base point of the distance as the lower surface of the window portion 21 has been described. However, the X-ray detection device 1 may use another portion in the X-ray detection device 1 as the base point of the distance. It is desirable that the base point of the distance is any position along the central axis of the X-rays emitted to the sample 6 or any position along the optical axis of the light which is reflected by the sample 6 and is then incident to the optical microscope 15. For example, the base point of the distance may be an emission opening of the X-ray source 11, a leading end of the X-ray optical element 12, or the mirror 14.

Furthermore, in Embodiments 1 and 2, the aspect in which the X-ray detection device is the energy dispersive type that separates the X-rays by energy and detects the X-rays has been described. However, the X-ray detection device may be a wavelength dispersive type that separates the X-rays by wavelength and detects the X-rays. Further, in Embodiments 1 and 2, the aspect in which the sample 6 is irradiated with the X-rays and the fluorescent X-rays generated from the sample 6 are detected has been described. However, the X-ray detection device 1 may irradiate the sample 6 with radiation other than the X-rays and may detect characteristic X-rays generated from sample 6. Furthermore, in Embodiments 1 and 2, the aspect in which the radiation detection device is the X-ray detection device 1 has been described. However, the radiation detection device may be a type that detects radiation other than the X-rays using the detection unit 13. For example, the radiation detection device may be a type that irradiates the sample 6 with an electron beam and detects the secondary electrons or the reflected electrons generated from the sample 6 using the detection unit 13.

The invention is not limited to the content of the above-described embodiments, and various modifications of the invention can be made within the scope of the claims That is, embodiments obtained by combining technical means appropriately modified within the scope of the claims are also included in the technical scope of the invention.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A radiation detection device comprising:
    a sample holding unit;
    an optical microscope configured to observe a sample held by the sample holding unit;
    an irradiation unit that irradiates the sample observed by the optical microscope with radiation;
    a detection unit that detects radiation generated from the sample irradiated with the radiation;
    a focal position adjustment unit that adjusts a focal position of the optical microscope;
    a driving unit that drives the sample holding unit;
    a processor; and
    a memory, wherein the processor is operable to:
    adjust a relationship between the focal position and a position of the sample such that the optical microscope is focused on one portion of the sample using at least one of the focal position adjustment unit and the driving unit;
    change a position, on which the optical microscope is to be focused, on the sample using the driving unit;
    calculate a distance from a predetermined base point to the surface of the sample at the changed position on the sample according to the adjusted focal position;
    create a partial image captured by the optical microscope at the changed position on the sample in a state in which adjustment of the relationship is performed for focusing; and
    create a sample image including information in which the calculated distance is associated with each of a plurality of portions of the sample by combining a plurality of created partial images.

2. The radiation detection device according to claim 1, wherein the processor is further operable to:
    change sequentially a position irradiated with the radiation on the sample and create a radiation distribution in which a detection result of the radiation is associated with each portion of the sample; and
    create an element distribution indicating a distribution of elements in the sample on the basis of the radiation distribution.

3. The radiation detection device according to claim 2, wherein the processor is further operable to:
    perform deconvolution for the radiation distribution, using a size of each of portions which is irradiated with the radiation in the sample.

4. The radiation detection device according to claim 2, wherein the processor is further operable to:
    create the element distribution including a distribution of the elements in a height direction intersecting a surface of the sample, and
    the radiation detection device further includes a display unit that displays a cross-sectional view of the sample indicating a distribution of the elements in a plane intersecting the surface of the sample, on the basis of the element distribution.

5. The radiation detection device according claim 1,
    wherein, in a case in which the processor adjusts the focal position using the focal position adjustment unit and the optical microscope is not focused on the one portion, the processor moves the sample holding unit using the driving unit such that the optical microscope is focused on the one portion.

6. The radiation detection device according to claim 1, wherein the processor is further operable to:
    specify the size of the portion irradiated with the radiation in the sample on the basis of the calculated distance.

7. The radiation detection device according to claim 1, wherein the distance from the predetermined base point to the surface of the sample at the changed position is calculated by determining a second distance between a reference focal position and a focal position of the optical microscope on the surface of the sample at the changed position based on a distance of adjustment by the at least one of the focal position adjustment unit and the driving unit, the reference focal position being a predetermined distance from the base point.

8. A non-transitory recording medium recording a computer program that causes a computer to control a radiation detection device including an optical microscope configured to observe a sample, an irradiation unit that irradiates the sample observed by the optical microscope with radiation, and a detection unit that detects radiation generated from the sample irradiated with the radiation, wherein the computer program causes the computer to perform a process including:

a step of adjusting a relationship between a focal position of the optical microscope and a position of the sample such that the optical microscope is focused on one portion of the sample;

a step of changing a position, on which the optical microscope is to be focused, on the sample;

a step of calculating a distance from a predetermined base point to the surface of the sample at the changed position on the sample according to the adjusted focal position;

a step of creating a partial image captured by the optical microscope at the changed position on the sample in a state in which adjustment of the relationship is performed for focusing; and a step of creating a sample image including information in which the calculated distance is associated with each of a plurality of portions of the sample by combining a plurality of created partial images.

9. The recording medium according to claim 8, wherein the computer program causes the computer to perform the process further including:

a step of specifying a size of a portion which is irradiated with the radiation in the sample;

a step of sequentially changing a position irradiated with the radiation on the sample and creating a radiation distribution in which a detection result of the radiation and the specified size are associated with each portion of the sample; and a step of performing deconvolution for the radiation distribution, using the size associated with each portion of the sample.

10. A method for positioning a portion to be irradiated with radiation in a sample using a radiation detection device including an optical microscope configured to observe a sample, an irradiation unit that irradiates the sample observed by the optical microscope with the radiation, and a detection unit that detects radiation generated from the sample irradiated with the radiation, the method comprising:

adjusting a relationship between a focal position of the optical microscope and a position of the sample such that the optical microscope is focused on one portion of the sample;

sequentially changing a position, on which the optical microscope is to be focused, on the sample;

calculating a distance from a predetermined base point to the surface of the sample at the changed position on the sample according to the adjusted focal position;

creating a partial image captured by the optical microscope at the changed position on the sample in a state in which adjustment of the relationship is performed for focusing;

creating a sample image including information in which the calculated distance is associated with each of a plurality of portions of the sample by combining a plurality of created partial images; and positioning the portion to be irradiated with the radiation in the sample, on the basis of the sample image.

* * * * *